United States Patent [19]
Whang

[11] Patent Number: 5,517,960
[45] Date of Patent: May 21, 1996

[54] ROTATING INTERNAL COMBUSTION ENGINE

[76] Inventor: Dong I. Whang, Lakwon Villa 302, 408-316, Bulkwang 3-dong Eunpyeong-ku, Seoul, 122-043, Rep. of Korea

[21] Appl. No.: 211,657
[22] PCT Filed: Oct. 16, 1992
[86] PCT No.: PCT/KR92/00048
 § 371 Date: Apr. 11, 1994
 § 102(e) Date: Apr. 11, 1994
[87] PCT Pub. No.: WO93/08388
 PCT Pub. Date: Apr. 29, 1993

[30] Foreign Application Priority Data

Oct. 18, 1991 [KR] Rep. of Korea ................. 91-18416
May 6, 1992 [KR] Rep. of Korea ................. 92-7605
Sep. 4, 1992 [KR] Rep. of Korea ................. 92-16124

[51] Int. Cl.$^6$ ........................................ F02B 53/00
[52] U.S. Cl. ........................................ 123/229
[58] Field of Search ........................... 123/229, 232

[56] References Cited

U.S. PATENT DOCUMENTS

| 428,762 | 5/1890 | Sharpneck | 123/229 |
| 3,837,323 | 9/1974 | Delfino et al. | 123/229 |

FOREIGN PATENT DOCUMENTS

| 1176920 | 8/1964 | Germany | 123/229 |
| 47-20164 | 6/1972 | Japan . | |
| 60-128936 | 7/1985 | Japan . | |
| 57458 | 9/1924 | Sweden | 123/229 |

Primary Examiner—Michael Koczo
Attorney, Agent, or Firm—Dilworth & Barrese

[57] ABSTRACT

A rotating internal combustion engine having a structure including an outer housing and inner rotors arranged as concentric rotating bodies. The rotating internal combustion engine is designed to prevent oil films from rupturing as well as to prolong the life of seals while faces of oil seals and gas-tight seals are intended to contactedly move along the same plane in the same direction by concentric movement rather than quaking movement or eccentric movement.

13 Claims, 11 Drawing Sheets

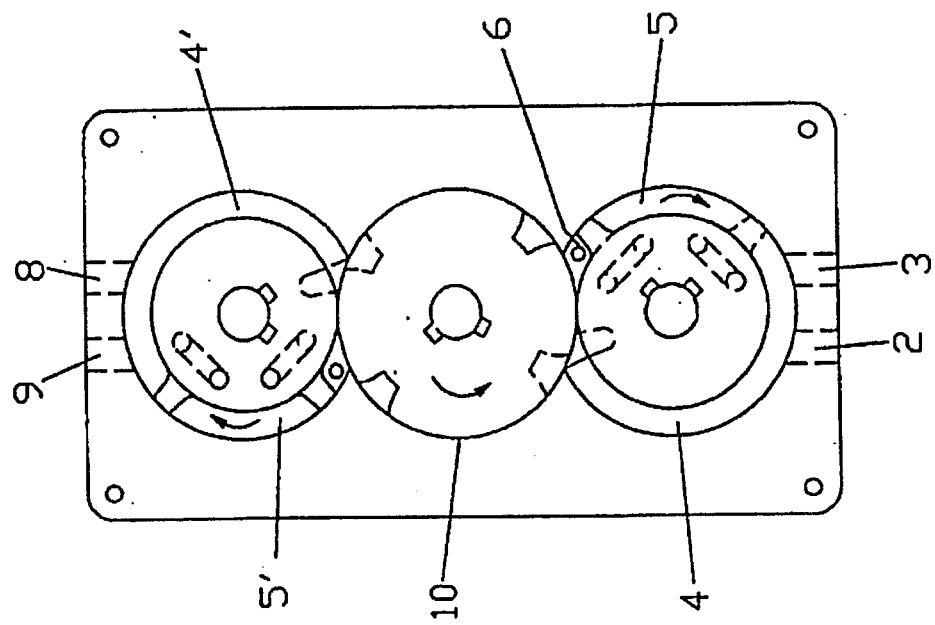
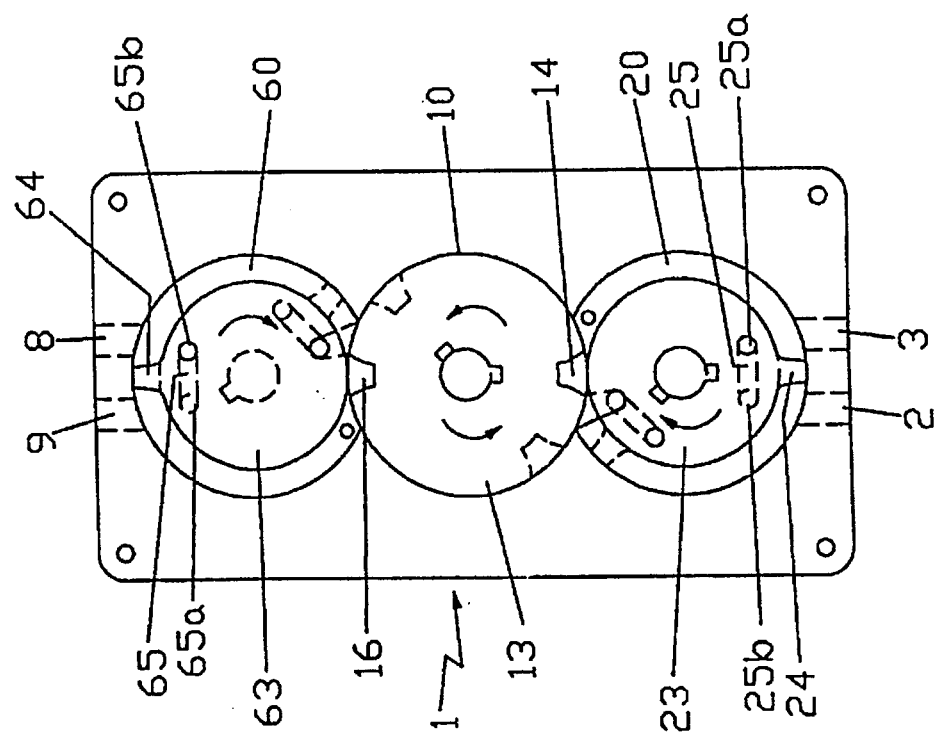

ROTATING INTERNAL COMBUSTION ENGINE

BACKGROUND OF THE INVENTION

1. Field of the Invention

This invention relates to a rotating internal combustion engine, more particularly, to such a rotating internal combustion engine that includes simplifying concentric rotating bodies, such as an outer housing, an inner rotor and the like, so as to achieve the enhanced efficiencies and stabilized operation.

2. Description of Related Art

In general, it has been well known that internal combustion engines are designed such that the fuel-air mixture in which liquid fuel, such as gasoline, diesel oil or the like, is mixed with air should be compressed and then burned inside the engine, and that consequent rotating power due to the explosive force during the burning of the mixture can be generated.

Conventionally, most internal combustion engines have a reciprocating-piston which slides back and forth in a cylinder in order to compress the mixture, and have a connecting-rod and crank (including crank shaft) mechanism in order to change the linear movement of the piston into resultant rotating power.

Therefore, complexity of the engine structure as well as inferiority of the engine efficiencies due to the power transmission through a lot of means have given impetus to vigorous studies which enable the direct rotating power from the internal combustion engine.

As a result, the Wankel Rotating Combustion Engine has been developed at the end. However, the Wankel engine has had many problems:

the production costs are raised due to the complexity of its structure; vibration from the engine and wear and consumption of the engine parts are increased because a driving shaft is constructed as a crank mechanism as in a reciprocating engine; and noise and wear due to round shaped tip of Apex Seal are generated.

The more improved rotary engine has been disclosed in Japanese Patent Gazette Sho 63-31650, wherein there exist many disadvantages as follows: the total dimension and structure of the engine becomes larger and complicated because the rotors consist of a separated compression rotor and an expansion rotor; and the production costs and mechanical consumption are increased. And the structural features are characterized in that the intake and exhaust valves disposed at both sides of combustion chamber respectively are reciprocating valves using the pressure difference, and that the metallic valves are consequently opened and closed due to the difference of air pressure only and intended to be harmonized with neighboring parts. Thus this engine is found to be inadequate in high-speed running. In addition, noise and vibration due to the reciprocating movement of the valves expedites the consumption of the engine parts. Besides, this engine has a further problem in which throttling loss also occurs at the narrower range from the combustion chamber disposed separately to a vane piston.

SUMMARY OF THE INVENTION

Accordingly, a primary object of the present invention is to provide a rotating internal combustion engine which has a simplifying structure that consists of an outer housing and inner rotors arranged as concentric rotating bodies.

Another object of the present invention is to provide a rotating internal combustion engine which is designed to prevent an oil film from rupturing as well as to prolong the life of seals while surfaces of oil-seals and gas tight-seals are intended to be contactedly moved along the same plane in the same direction by accomplishing only concentric movement rather than quaking movement or eccentric movement thereof.

In order to accomplish the above objects, a rotating internal combustion engine of this invention is provided, comprising:

a housing which is integrated with a single body provided with an intake port and an exhaust port respectively, a pair of engaging rotors provided with two flanges, the rotors being installed within said housing and intended to compress the air introduced through the intake port, a vane piston which is protrudedly provided on one of said rotors, the vane piston being intended to engage with an engaged groove provided on the other rotor so as to produce the compressed air, wherein said housing is integrated with an assembly which consists of a central housing, a front housing and a rear housing which have shaft holes and which are juxtaposedly secured to the front and rear faces of the central housing respectively, and a gear casing which is juxtaposedly secured to the rear face of the rear housing, said central housing having upper and lower cylindrical cylinders which have true-circular inner circumferential surfaces and are opened at both ends with some portions of the cylinders being communicated with each other, and wherein, a driven rotor having an engaged groove provided on some portion of the outer circumferential surface thereof is positioned in a gas-tight manner within said upper cylinder, and compression and combustion chambers are provided in said lower cylinder and a driving rotor having a protrusion-shaped vane piston provided on some portion of the outer circumferential surface thereof is also positioned within said lower cylinder so as to rotate concentrically together with a rotating shaft, and wherein, said driving rotor is provided with compressed gas storing means for storing the compressed gas produced during the rotation of the rotor temporarily and the inner sides of the front and rear housings are provided with compressed air intaking and exhausting means communicated with the compressed gas storing means of the driving rotor so that the operations which intake, compress, explode and exhaust the mixture gas during the concentric rotation of the driving rotor can occur in succession, and wherein, said engine is designed to increase the engine efficiencies by eliminating the throttling loss during the rotation and by rotating the shaft directly.

BRIEF DESCRIPTION OF THE DRAWINGS

FIGS. 8(A) and 8(B) are schematic plan views showing the operation states according to further embodiment of the invention;

DETAILED DESCRIPTION OF THE INVENTION

Figure 1:
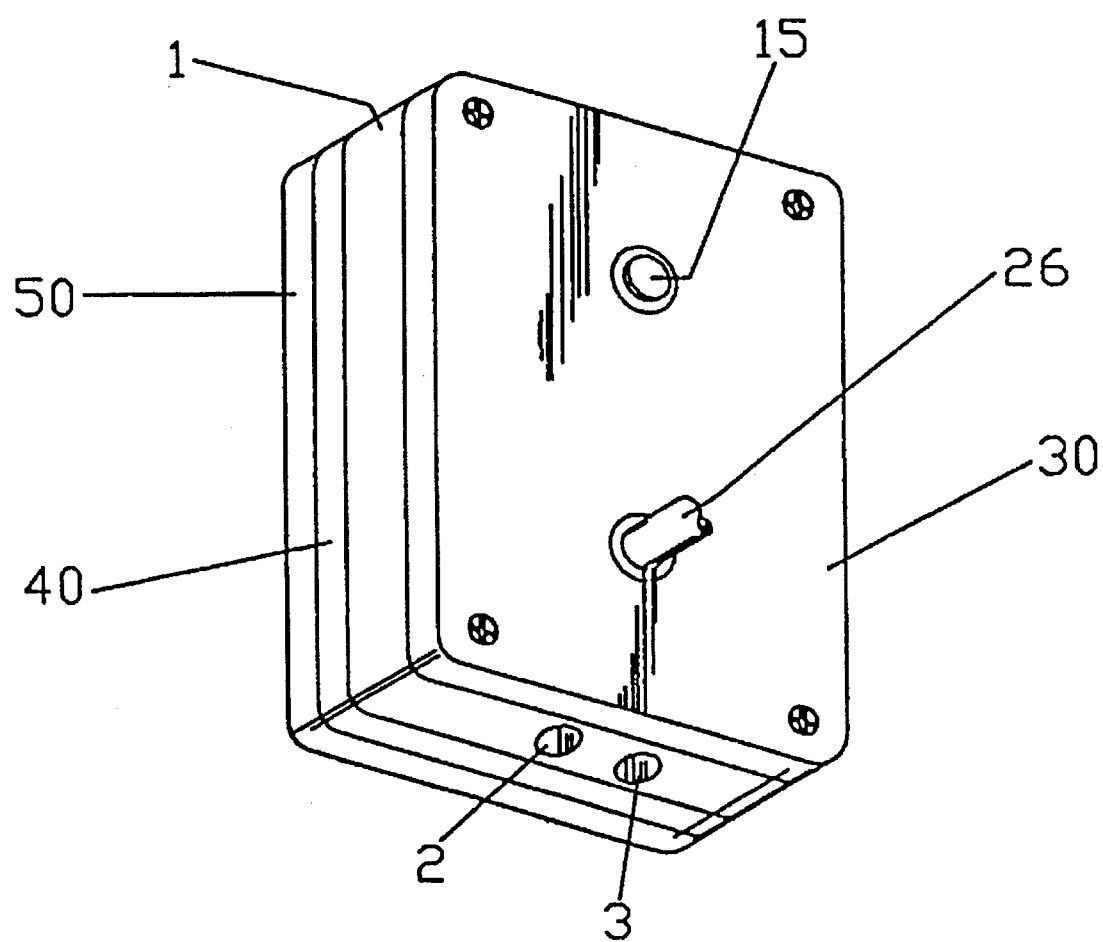
FIG. 1 is a perspective view of the present invention.
Figure 2:
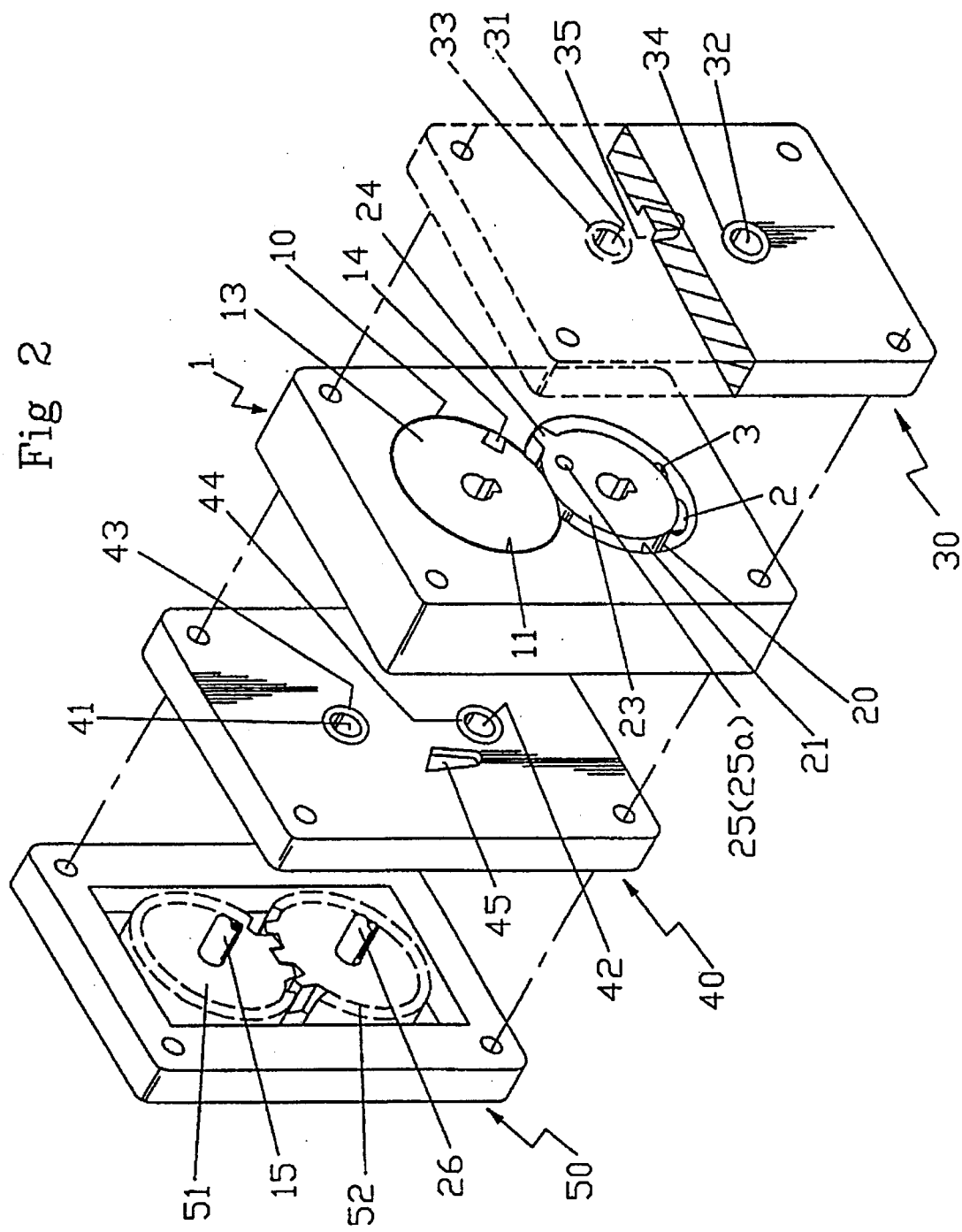
FIG. 2 is a partially cut-off perspective view showing the essential parts of the invention.
Figure 3:
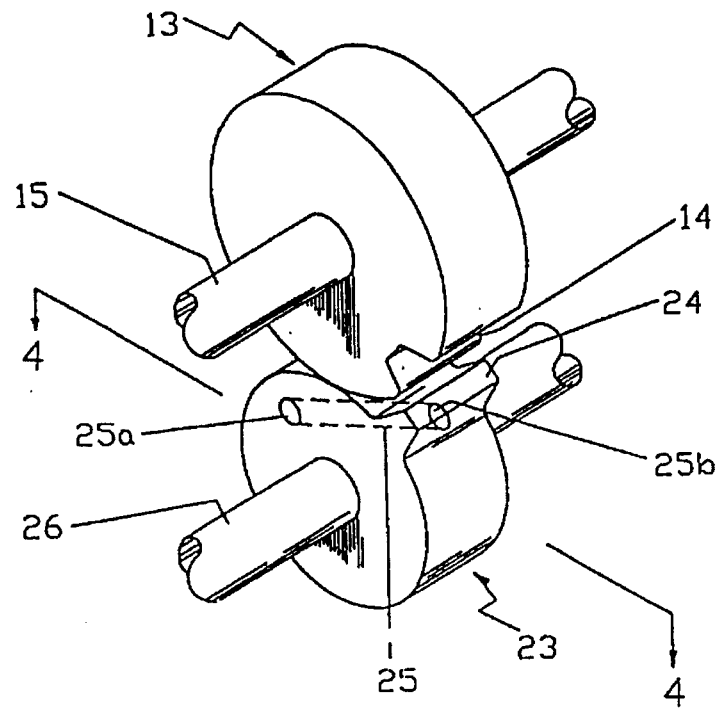
FIG. 3 is a perspective view showing the rotors of the invention.
Figure 4:
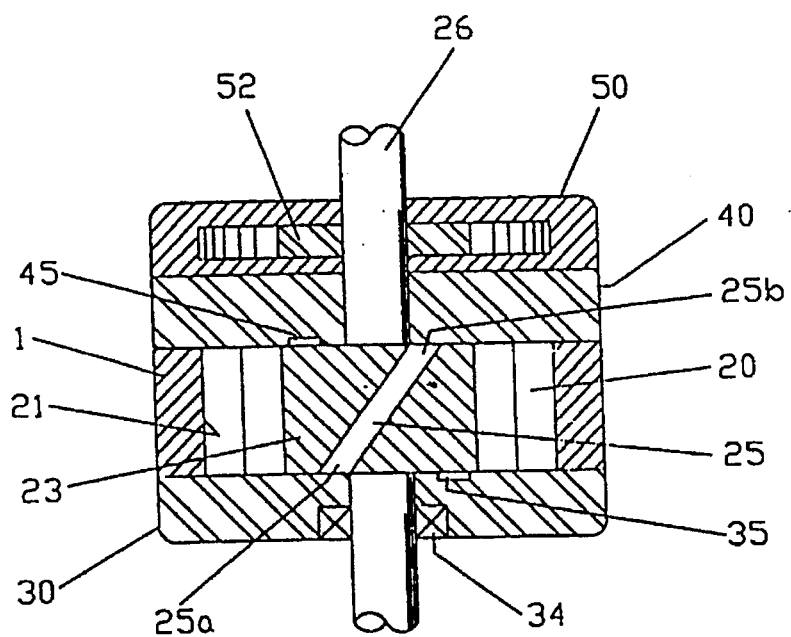
FIG. 4 is a cross-sectional view along the direction of the line 4—4 of FIG. 3.

The objects, features and advantages of the invention will be apparent from the following description of the preferred embodiments with reference to the accompanying drawings.

It is to be understood that the invention is not limited to the following embodiments thereof.

Referring to FIG. 1 to FIG. 4, the rotating internal combustion engine comprises a central housing (1) having upper and lower portions with upper and lower cylinders (10 and 20 respectively) disposed therein which have true-circular inner circumferential surfaces (11 and 21 respectively) are opened at both ends with some portion of the cylinders being communicated with each other, a driving rotor (23) which is closely housed within said lower cylinder (20) having an intake port (2) and an exhaust port(3) at lower right and left sides thereof respectively, and which has a protrusion-shaped vane piston (24) provided on the outer circumferential surface thereof, and has an inclined hole (25) for storing the compressed air temporarily therein. As illustrated in FIGS. 5 and 6, the inclined hole (25) has a longitudinal axis substantially perpendicular to the longitudinal axis of the shaped vane piston (24). The longitudinal axis extends obliquely from a front face to a rear face of the driving rotor (23). The longitudinal axis of the hole (25) extends in continuous straight line from a first end to a second end of the hole (25). The rotating internal combustion engine further comprises a driven rotor (13) which is closely housed within said upper cylinder (10) having a groove (14) engaged with the protrusion-shaped vane piston (24) of said driving rotor (23), a front housing (30) which has shaft holes (31,32) and their shaft bearing metals (33,34) into which the shafts (15,26) of said driven rotor (13) and driving rotor (23) are inserted to rotate respectively, and has an exhaust recess (35) provided at the corresponding position on its rear face to a front opening (25a) of an inclined hole (25) of said driving rotor (23), a rear housing (40) which has shaft holes (41,42) and their shaft bearing metals (43,44) into which the shafts (15,26) of said driven rotor (13) and driving rotor (23) are inserted to rotate respectively, and has an intake recess (45) provided at the corresponding position on its rear face to a rear opening (25b) of the inclined hole (25) of said driving rotor (23), and a gear casing (50) which is secured to the rear face of said rear housing (40) and within the interior of which a driven gear (51) and a driving gear (52) are housed in tooth-engagement relationship, said driven gear (51) and said driving gear (52) being coaxially fixed to the shafts (15,26) of said driven rotor (13) and said driving rotor (23) respectively so as to rotate with rotation of the shafts. And, said central housing (1), front housing (30), rear housing (40) and gear casing (50) are juxtaposedly secured with fastening threaded bolts and nuts which are not shown in the drawings with or without leakage-proof packing materials being disposed therebetween. Any other suitable fastening means to meet said fastening purpose may be used.

The intake recess (45) or the rear housing (40) is intended to be positioned at the ending point of a compression chamber (4) along the rotation path of the vane piston (24) previously before said driving rotor (23) is just tooth-engaged with said driven rotor (13). On the other hand, an exhaust recess (35) of the front housing (30), an ignition plug (6), and a fuel injection port (7) through which the gas-phase fuel mixture is supplied from the exterior thereof are intended to be positioned at the beginning point of a combustion chamber (5) along the rotation path of the vane piston (24), directly after said driving rotor (23) is just tooth-disengaged with said driven rotor (13).

Now, the operation of the rotating internal combustion engine with the above-described constitution according to this invention will be described hereinafter with reference to a series of operations which comprises successive processes or intake→compression→explosion→exhaust.

Figure 5A:
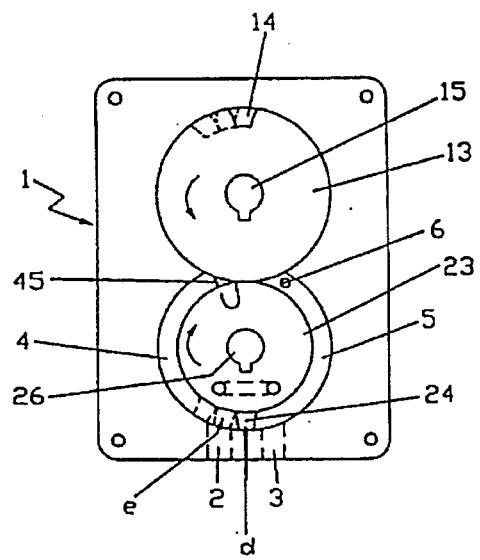
FIGS. 5(A), 5(B), 5(C) and 5(D) are schematic plan views showing the operation states of the invention.

FIG. 5(A) shows an intake process of the rotating internal combustion engine according this invention.

This drawing shows the state, wherein the outer air is introduced into an arcuated air compression chamber (4) defined between the cylinder (40) and the driving rotor (23) through the intake port (2) provided at the lower side of the central housing (1).

Figure 5B:
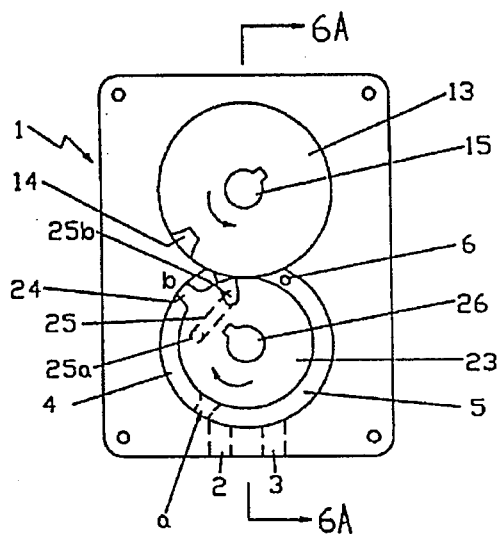

FIG. 5(B) shows a compression process of the engine.

This drawing shows the state, wherein as the rotors (13,23) begin to rotate concurrently by the rotational movement of gears (51,52) housed within the gear casing (50) after the outer air has been introduced into the compression chamber (4) through the intake port (2), it becomes then a compression state as soon as the vane piston (24) is positioned at the point "a".

That is, with the air introduced into the arcuated air compression chamber (4) through the intake port (2) at said intake operation having already been supercharged, as the driving rotor (23) rotates so that the vane piston (24) moves to enter into the compression chamber (4) while the driving rotor rotates, the air inside the compression chamber (4) is then compressed gradually by larger pressure.

Figure 6A:
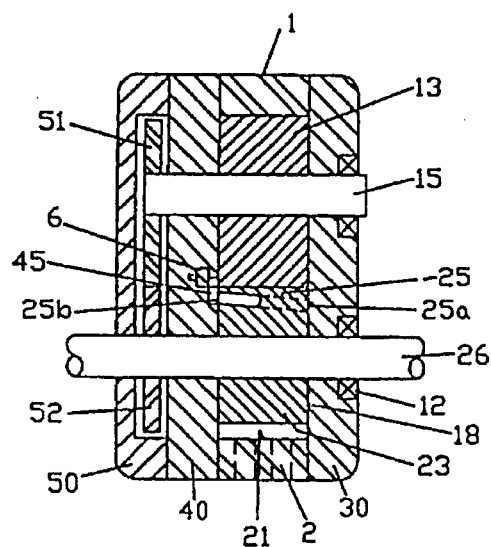
FIG. 6(A) is a cross-sectional view along the line 6A—6A of FIG. 5(B)
Figure 6B:
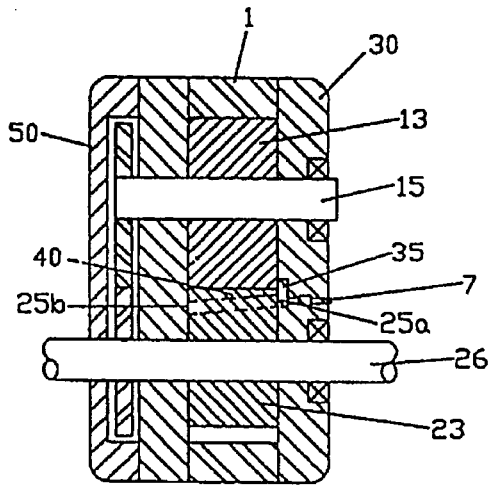
FIG. 6B is a cross-sectional view along the line 6B—6B of FIG. 5C.

Thus, if the vane piston (24) of the driving rotor (23) positioned at the point "a" rotates in the direction of the arrow shown in FIG. 5(B) performing the compression operation with the help of the rotation of the driven rotor (13) and then moves to the point "b", the compressed air within the air compression chamber (4) enclosed between the driving rotor (23) and the driven rotor (13) is introduced into the interior defined with the intake recess (45), the rear opening (25b), and the inclined hole (25) and is then stored temporarily, as soon as the rear opening (25b) of the inclined hole (25) is interconnected with the intake recess (45) provided on the rear housing (40) (refer to FIG. 6(B)).

If the rotors (13,23) continue to rotate under this state, the front end portion of the groove (14) provided at the driven rotor (13) is then met the upper end of the compression face of the vane piston (24).

If further rotation occurs, as the front end portion of the groove (14) moves on the compression face of the vane piston (24) in contact relationship, the entire compressed air within the compression chamber (4) is forcibly squeezed out via the intake recess (45)→into the rear opening (25b)→into the inclined hole (25).

Because the front opening (25a) of the inclined hole is closed by the inner wall surface of the front housing (30), the compressed air introduced into the interior of the inclined hole (25) can not flow out to the exterior thereof and is in a stored state (refer to FIG. 6(A)).

Figure 5C:
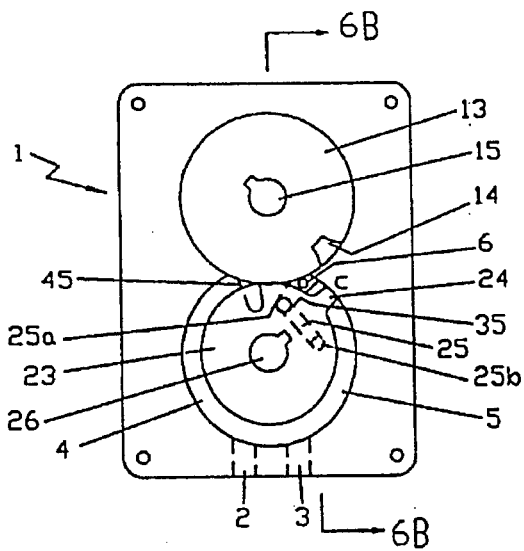

FIG. 5(C) shows a explosion (combustion) process of the engine, wherein as the rotation of the driving rotor (23) and the driven rotor (13) is further advanced than in the compression process, the rear end portion of the engaged groove (14) is contactedly moved along the rear side face of the vane piston (24).

At this time, the combustion chamber (5) between the driving rotor (23) and the driven rotor (13) is gradually defined, and the front opening (25a) in the inclined hole (25) of the driving rotor (23) comes to be interconnected with the exhaust recess (35) which is intended to be always interconnected with the compression chamber (5) (refer to FIG. 6(B)). At this time, the rear opening (25b) is, on the contrary, in the state closed by the inner wall face of the rear housing (40) (FIG. 6(B)).

As soon as the exhaust recess (35) comes to be met with the front opening (25a) of the inclined hole (25), the compressed air stored within the inclined hole (25) is then exhausted to the combustion chamber via exhaust recess (35).

At the same time as the compressed air is exhausted to the compression chamber (5) in which the ignition plug (6) is disposed, the fuel injection port (7), which is provided in the wall body of the front housing (30) defining the combustion chamber (5) so as to communicate to the chamber (5), performs the fuel injection toward the chamber (5) so that the air and fuel are mixed in the cumbustion chamber (5) to become fuel-mixed gas.

At the state, further rotations of the driving rotor (23) and driven rotor (13) occur so that the vane piston (24) contacts the inner circumferential surface (21) of the cylinder (20), and if the engaged groove (14) is then reached at the point "c" shown in FIG. 5(C), the state which the groove (14) is positioned on the inner circumferential surface (11) of the upper cylinder (10), the charging operation of the compressed gas mixture is then completed within the interior of the compression chamber (5) and is consequently ignited by the ignition plug (6) disposed to communicate to the combustion chamber (5) in the wall body of the rear housing (40) and is finally expanded and exploded.

By this, the vane piston (24) is moved toward the exhaust port (3) described hereinafter while the outer peripheral surface of the end thereof receives the explosive pressure directly, and keeps the driving power till the exhaust port (3) is opened by the vane piston (3), as shown in FIG. 5(A).

Figure 5D:
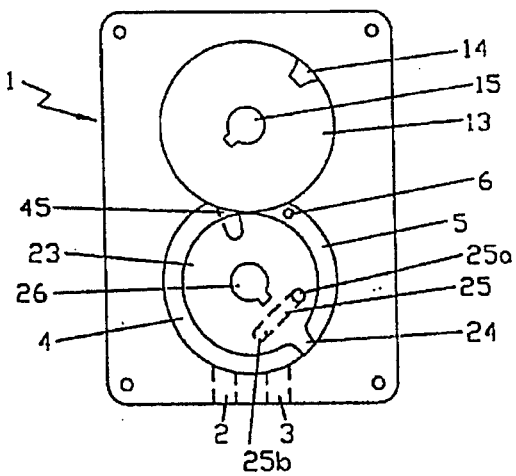

FIG. 5(D) shows an exhaust process of the engine, wherein if the state of the vane piston (24) of the driving rotor (23) which receives the rotation force at the explosion process returns to the state as in FIG. 5(a) via FIG. 5(D), the exhaust port (3) is then opened and the exhaust gas remains exhausted through the exhaust port (3).

On the other hand, when the vane piston (24) remains rotating and reaches at the point "d" shown in FIG. 5(A), the expanded exhaust gas collides with the outer air introduced from the intake port (2), and the boundary between the exhaust gas and the air temporarily occurs, thereby a sort of air curtain is built up and some portion of the outer air comes to press the air within the arcuated compression chamber (4).

If the vane piston (24) is moved to the point "e" at this state, some portion of the air introduced through the intake port (2) is exhausted through the exhaust port (3). Further rotation of the vane piston (24) performs the compression operation against the air within the compression chamber (4).

And the exhausted gas remaining in the combustion chamber (5) is pushed and is totally discharged by the front face of the vane piston (24) during the subsequent explosion process.

The processes shown in FIGS. 5(A), 5(B), 5(C) and 5(D) are repeatedly performed in turn, thereby generating the driving force.

FIG. 7 shows another embodiment of the invention, wherein the parts functioning similarly to the parts described in the foregoing are indicated by the same reference numerals and symbols used in the foregoing.

In this embodiment, a driving rotor (23) is provided with two vane pistons (24,27) and two inclined holes (25,28), and a driven rotor (13) which is rotating together with the driving rotor (23) is provided with two corresponding engaged grooves (14,16) to said vane pistons (24,27), whereby the driving rotor (23) and the driven rotor (13) are intended to perform the operations of intake→compression→explosion→exhaust while the two vane pistons (24,27) and the engaged grooves (14,16) are alternatively tooth-engaged to each other during every rotation of the driving rotor (23) and driven rotor (13), that is, two times of the operations of intake→compression→explosion→exhaust are performed during every one rotation of the driving rotor (23) and driven rotor (13).

Figure 7A:
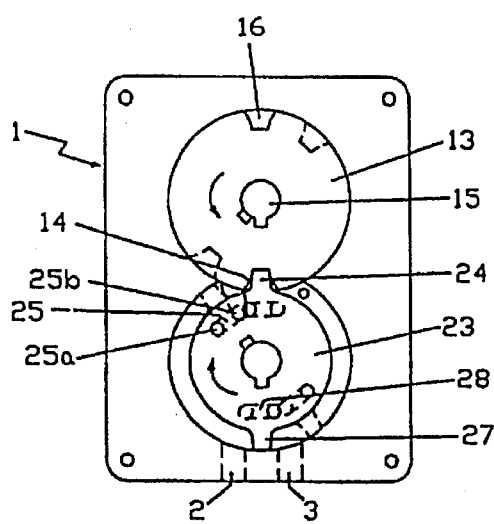
FIGS. 7(A) and 7(B) are schematic plan views showing the operation states according to another embodiment of the invention.
Figure 7B:
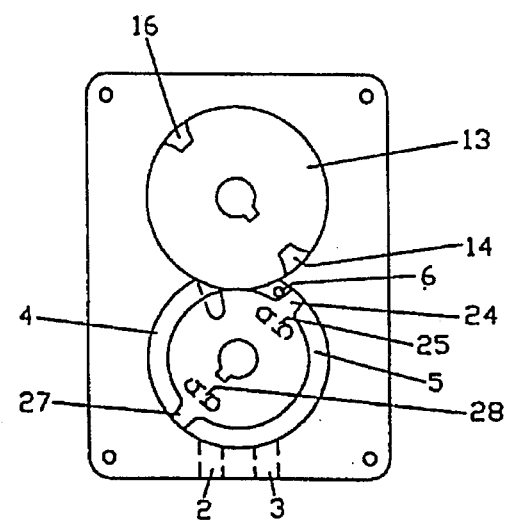

FIG. 7(A) shows an intake stale and a compression state of the outer air, and FIG. 7(B) shows an explosion state and an exhaust state, while particular description about such operations is eliminated herein, which is identical with as in said embodiment.

FIG. 8 shows further embodiment of the invention, wherein the parts functioning similarly to the parts described in the foregoing are indicated by the same reference numerals and symbols used in the foregoing.

In this embodiment, a central housing is so constructed that an intake port (8) and an exhaust port (9), which are corresponding to an intake port (2) and an exhaust port (3) disposed to a bottom wall portion, are provided at the central part of the upper wall portion thereof, and that one more cylindrical cylinder (60) is provided at the interior thereof so as to comprise three cylinders (60,10,20) in which three rotors (63,13,23) are housed respectively.

That is, the rotor (13) having two engaged recesses is housed in the central cylinder (10), and the rotors (63,23) having vane pistons (64,24) respectively are housed in upper and lower cylinders (60,20) respectively.

Among the rotors, only the rotor located at lower side is a driving rotor (23), and the rest located above the driving rotor (23) are driven rotors (63,13) which rotate concurrently during the rotation of the driving rotor (23).

As shown in FIG. 8, this embodiment is intended that the operation of intake→compression→explosion→exhaust occurs concurrently at two locations through the intake ports (2,3) and the exhaust ports (8,9), each being provided at both sides of the central housing respectively, by way of the rotors (23,63) having the vane pistons (24,64) respectively, FIG. 8(A) shows the processes from the intake of the outer air to the compression thereof, and FIG. 8(B) shows the processes from the expansion and explosion of the gas mixture to the exhaust thereof.

Particular description about the operations of intake→compression→explosion→exhaust, which occur during the rotations of rotors (13,23,63) is eliminated herein, which is identical with as in said embodiment.

FIG. 9 shows further embodiment of the invention, wherein the parts functioning similarly to the parts described in the foregoing are indicated by the same reference numerals and symbols used in the foregoing.

As shown in the drawing, this embodiment is intended to obtain the doubling of explosive power by compressing the air introduced concurrently through the intake ports (8,2) provided at the upper and lower port of a central housing (1), wherein two pairs of engaged recesses (72,82) are provided in the upper and lower cylinder (70,80) of the central housing (1) in which intake ports (8,9) and exhaust ports (2,3) are provided at the central parts of the upper and lower wall thereof respectively.

Figure 9B:
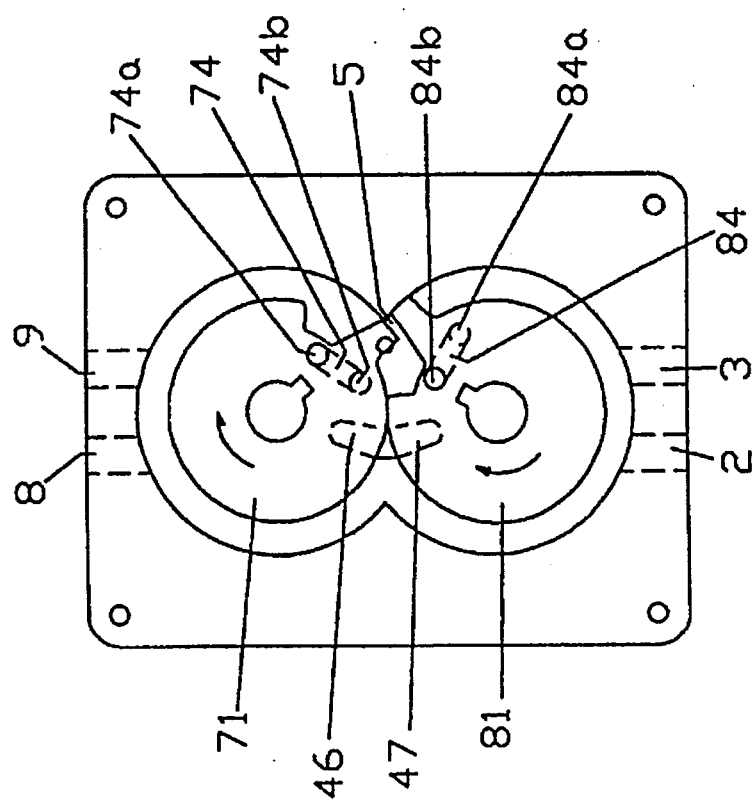
FIGS. 9(A) and 9(B) are schematic plan views showing the operation states according to further embodiment of the invention.
Figure 9A:
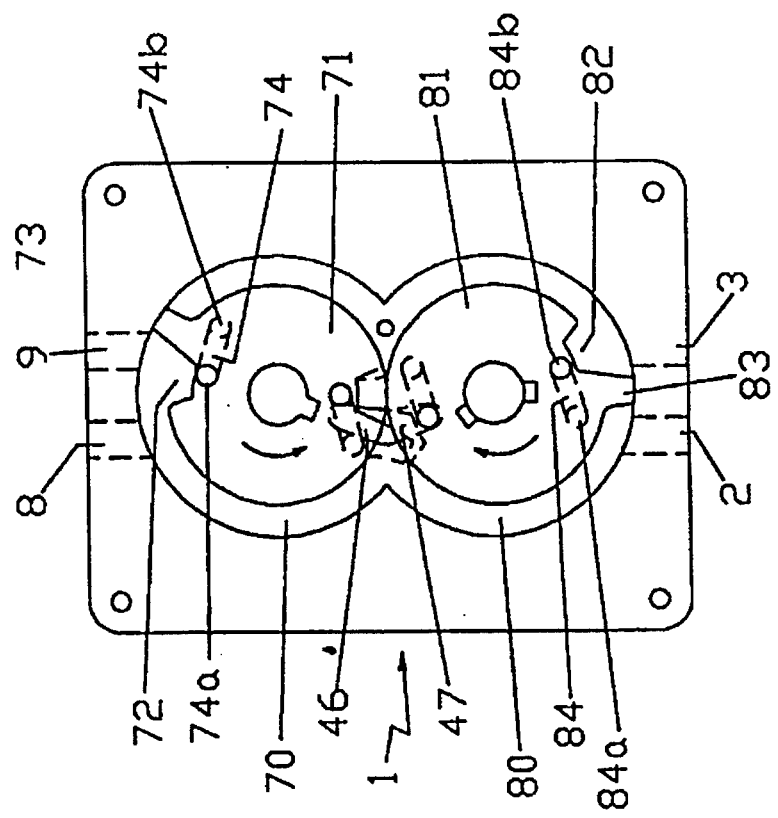

FIG. 9(A) shows the processes of the intake and compression the outer air, wherein the position of the rotors (71,81) depicted by solid line is the intake state of the outer air.

As shown in the drawing, when the rotors are rotated and reach to the position depicted by dashed line, the vane piston (73) and engaged groove (82), and the vane piston (83) and engaged groove (72) are tooth-engaged respectively so that the compressed air is stored within the inclined hole (74,84) respectively through the intake recess (46,47) in the rear housing (40) and through the rear opening (74b,84b) communicated thereto.

FIG. 9(b) shows the processes of the explosion (combustion) and exhaust, wherein, with said compressed air being stored within the inclined hole (74,84), when the rotors are further rotated, the combustion chamber (5) is defined while the state as in FIG. 9(B) is obtained.

At this time, as the compressed air within the inclined hole (74,84) is injected into the interior of the combustion chamber (5) through the exhaust recess (which is constructed with same shape as the intake recess (46,47) of said tear housing (40) but is not shown in the drawing) in the front housing (30) and through the front openings (74a,84a), the compressed air is mixed with the fuel injected from the exterior thereof concurrently through the fuel injection port (7).

After being mixed, the gas mixture is ignited by the ignition plug (6) and is then expanded and exploded so as to generate the resultant driving force.

Further to the state as in FIG. 9(B), when each vane piston (73,83) moves beyond the exhaust ports (9,3), the exhaust of the burned gas is performed.

This embodiment is intended to obtain the doubling of driving force by compressing and exploding the air introduced through the intake ports (8,2) concurrently with the role of the two vane pistons (73,83).

Figure 10:
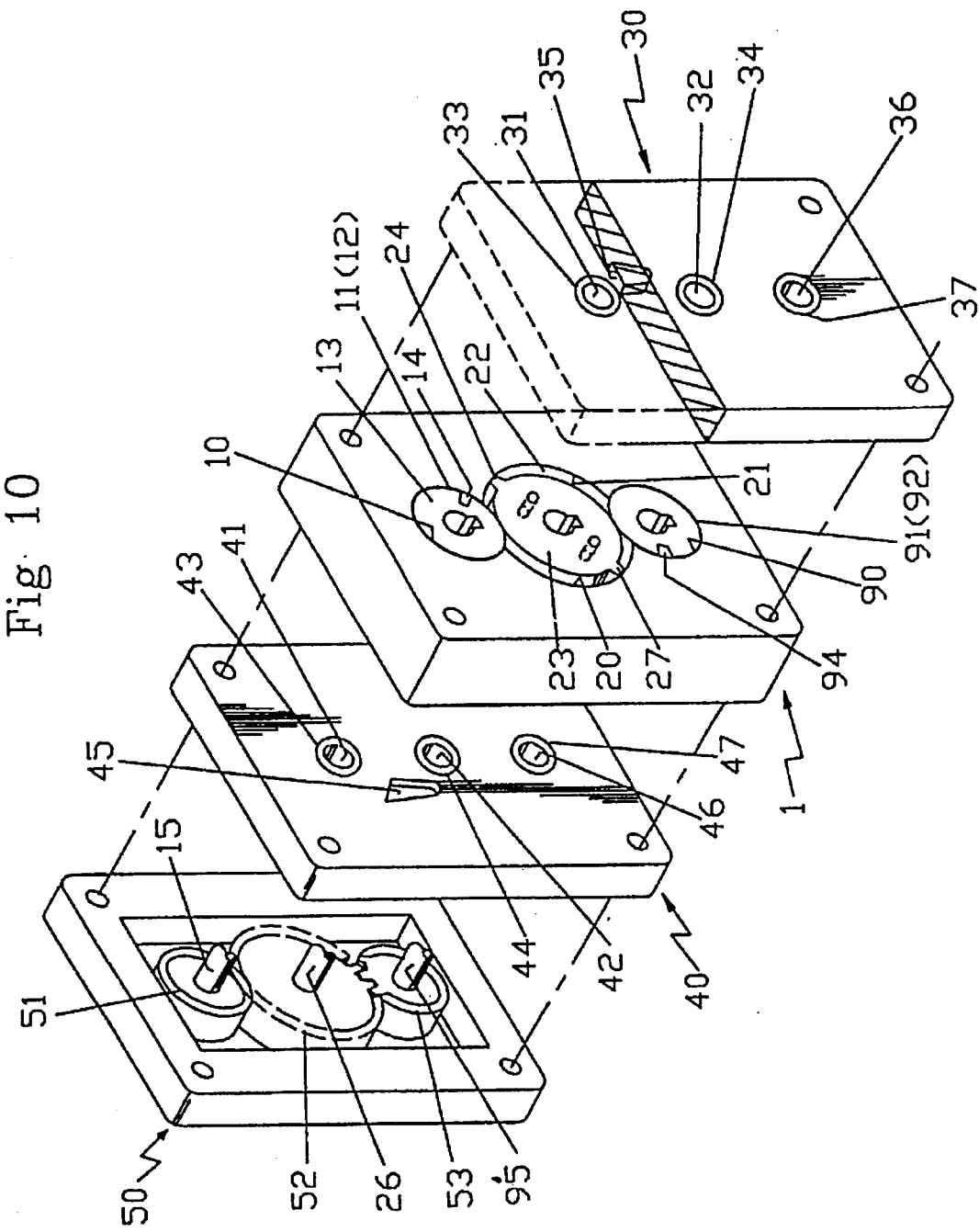
FIG. 10 is a partially cut-off perspective view according to the further embodiment of the invention.
Figure 11A:
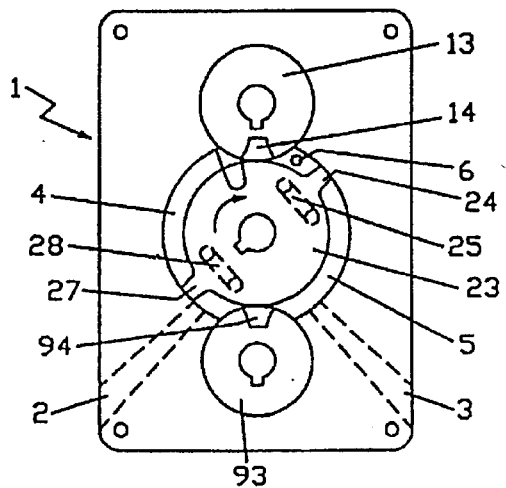
FIGS. 11(A), 11(B), 11(C), and 11(D) are schematic plan views showing the operation states of FIG. 10.
Figure 11B:
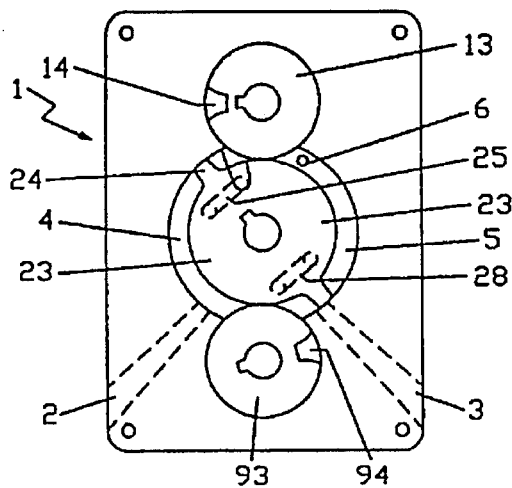
Figure 11C:
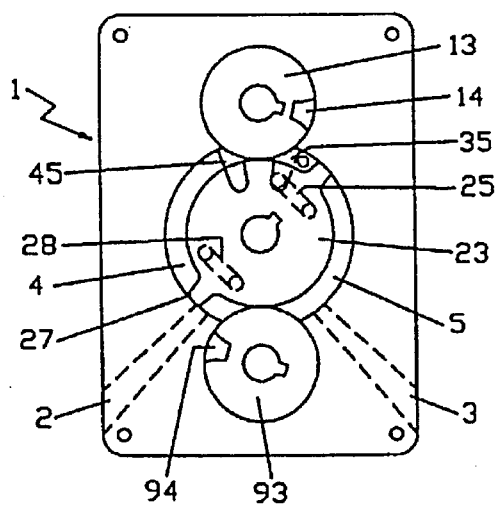
Figure 11D:
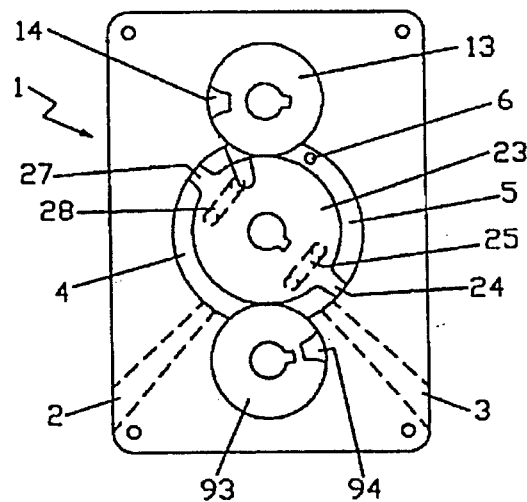

FIGS. 10 and 11 shows further embodiment of the invention, wherein the parts functioning similarly to the parts described in the foregoing are indicated by the same reference numerals and symbols used in the foregoing.

FIG. 10 shows the entire construction thereof, which comprises a central housing (1) having an upper cylinder (10), a cylindrical cylinder (20) and a lower cylinder (90) which are interconnected with each other while the moistened surfaces (12,22,93) having microporosity with the method such as acid-corrosion or the like are formed on the true-circular circumferential surfaces (11,21,91) so as to build up the enclosing films, a driving rotor (23) which is closely housed within said cylindrical cylinder (20) having an intake port (2) and an exhaust port (3) at lower right and left sides thereof respectively, and which has protrusion-shaped vane pistons (24,27) provided on the outer circumferential surface thereof at the opposed positions, and has inclined holes (25,28) for storing the compressed air temporarily therein, a driven rotor (13) for compression which is closely housed within said upper cylinder (10), and which has an engaged groove (14) contacting with vane pistons (24,27) of said driving rotor (23), a driven rotor (93) for discharging the burned gas, which is closely housed within said lower cylinder (90), and which has an engaged recess (94) contacting with vane pistons (24, 27) of said driving rotor (23), a front housing (30) which has shaft holes (31,32,36) and their shaft bearing metals (33,34,37) into which the shafts of said driven rotors (13,93) and driving rotor (23) are inserted to rotate respectively, and has an exhaust recess (35) provided at the corresponding positions on its rear face to front openings (25a,28a) of the inclined holes (25, 28) of said driving rotor (23), a rear housing (40) which has shaft holes (41,42,46) and their shaft bearing metals (43,44,47) into which the shafts (15,95,26) of said driven rotors (13,93) and driving rotor (23) are inserted to rotate respectively, and has an intake recess (45) provided at the corresponding position on its rear face to a rear opening (25b,28b) or the inclined holes (25,28) of said driving rotor (23), and a gear casing (50) which is secured to the rear face of said rear housing (40) and within the interior of which said driven gears (7,51,53) and driving gear (23) are housed in tooth-engagement relationship, said driven gears (7,51,53) and said driving gear (52) being coaxially fixed to the shafts (15,95,26) of said driven rotor (13,93) and said driving rotor (23) respectively so as to rotate with rotation of the shafts.

And, said driving rotor (23) and driven rotors (13,93) which are housed within the inner circumferential surfaces (21,11,91) of the cylinder (20) and the upper and lower cylinders (10,90) respectively are close-contactedly rotated therein with the moistened surface (22,12,92) of the liquid film made by the liquid fuel such as alcohol, gasoline, diesel oil or the like as well as any other liquids.

FIGS. 11(A) to 11(D) shows a series of successive operations of the intake, compression, explosion and exhaust of the air introduced from the exterior thereof, wherein two driven rotors (13,93) at an upper and lower part is engaged with one driving rotor (23) and is concurrently rotated, whereby the processes of intake, compression and explosion, and exhaust are concurrently performed so that two times of the processes of intake→compression→explosion→exhaust are performed during every one revolution.

Further, during the movement in the combustion chamber, the vane pistons (24,27) opposedly provided at the driving rotor (23) are rotated by receiving the explosive force with the rear face thereof, while the rotor performs the operation of discharging the exhausted gas throughly with the front face thereof after the completion of the combustion.

In addition, as the one driving rotor (23) and the two driven rotors (13,93) are close-contactedly rotated, it is possible to keep the space separated between the compression chamber (4) and the combustion chamber (5), whereby only the introduced air is completely compressed, and is mixed with the fuel injected from the exterior thereof through the fuel injection port (7), and is burned, thereby eliminating the problems due to the exhausted gas which is not discharged up to that after the combustion.

Likewise, particular description about the processes of intake→compression→explosion→exhaust is eliminated herein, as it is nearly identical with as in foregoing embodiments.

Figure 12:
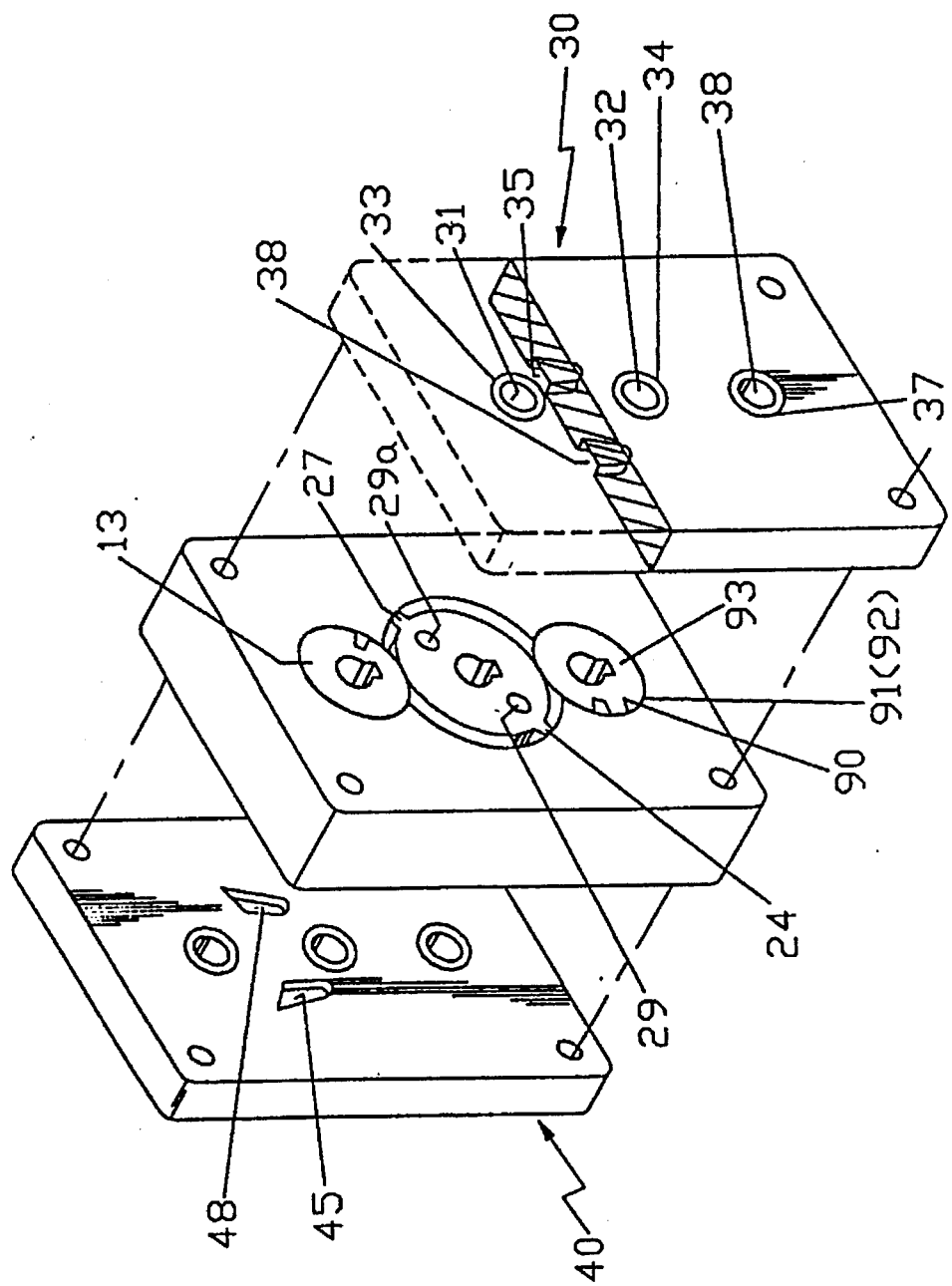
FIG. 12 is a partially cut-off perspective view according to the further embodiment of the inventions.

FIG. 12 shows further embodiment of the invention, wherein the parts functioning similarly to the parts described in the foregoing are indicated by the same reference numerals and symbols used in the foregoing.

In this embodiment, respective one of the exhaust recesses (34,48) and the intake recesses (38,45) is provided at the front housing (30) and the rear housing (40) respectively and vertical holes (29,29a) are provided at the insides of the two vane pistons (24,27) in the driving rotor (23) housed within the cylinder (20) of the central housing (1), so that the air mixed in the compression chamber (4) by the vane piston (24,27) of the driving rotor (23) is quickly introduced into the vertical hole (29,29a) of the driving rotor (23) through the front and rear openings via the exhaust recesses (35,48) provided at the front housing (30) and the rear housing (40) respectively, and when the vertical holes (29,29a) are contacted to the intake recesses (38,45) provided at the front and rear housings (30,40) respectively after the further rotations of the driving rotor (23), the compressed air inside the vertical hole (29,29a) is intended to be quickly sent to the combustion chamber (5) through the front and rear openings of the vertical hole (29,29a), thereby the flow of the mixed air is smoothly obtained even at high speed rotation.

Figure 13:
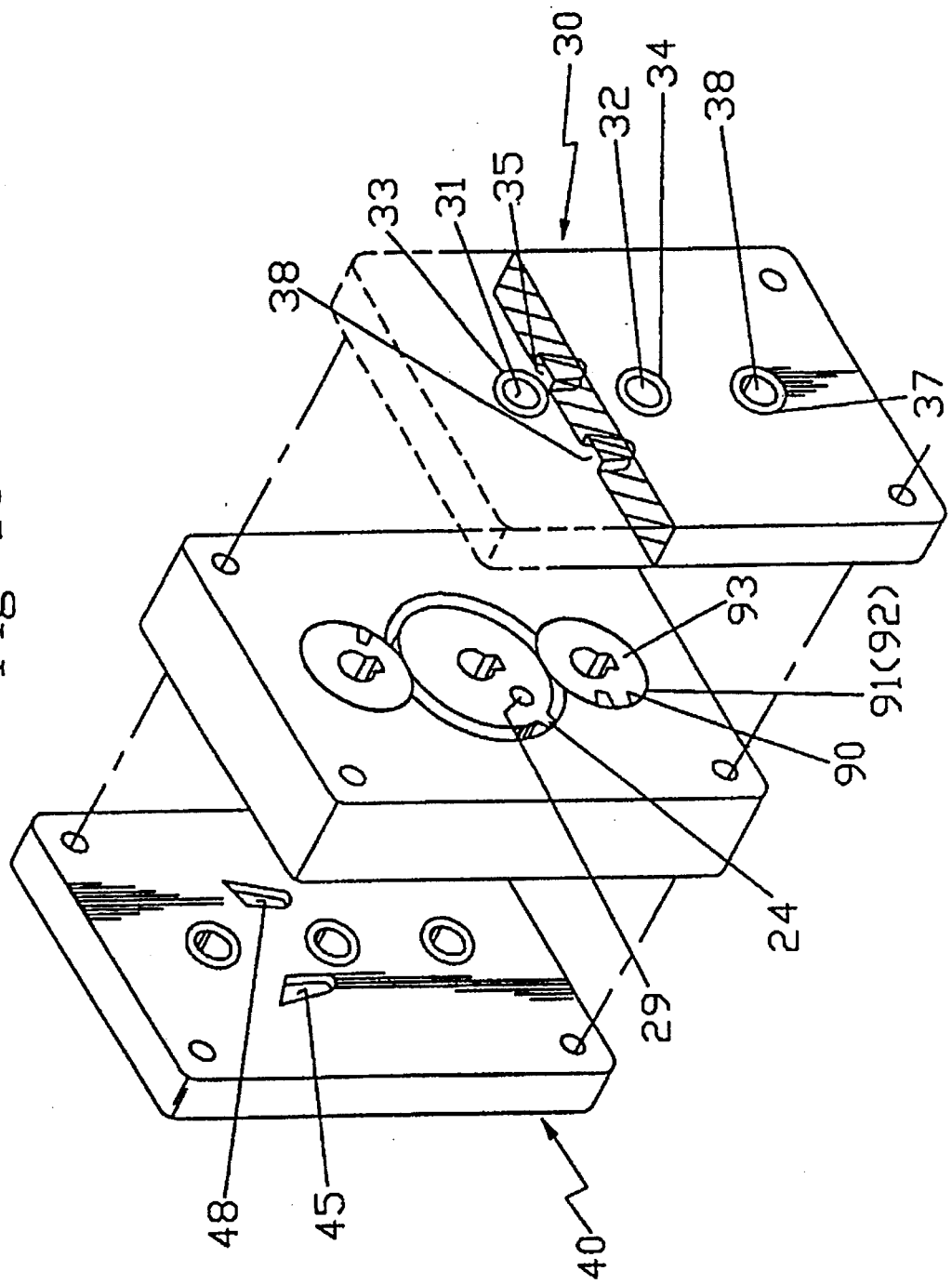
FIG. 13 is a partially cut-off perspective view according to the further embodiment of the invention.

FIG. 13 shows further embodiment of the invention, wherein the parts functioning similarly to the parts described in the foregoing are indicated by the same reference numerals and symbols used in the foregoing.

As shown in FIG. 13, this embodiment has nearly similar construction to those as in FIG. 12. However, in this embodiment, only one vane piston (24) and vertical hole (29) are provided at said driving rotor (23), and the rotational ratio of the gear casing, not shown, is predetermined to be 1:2:1, so that one driving rotor (23) and the driven rotors (13,93) disposed at upper and lower sides respectively are concurrently rotated by one revolution, thereby obtaining one stable explosive power during every revolution.

Likewise, particular description about the processes of intake→compression→explosion→exhaust is eliminated herein, as it is nearly identical with as in foregoing embodiments.

Furthermore, in this embodiment, the injection method is employed as an example for mixing the gas phase fuel supplied by injection through the fuel injection port (7) with the air after the completion of the air supply, but it may exert the same operation and effect that the method in which the premixed air at the exterior thereof instead of either of air or fuel may be introduced thereto and then compressed, and consequently burned and exploded by the ignition plug (6).

Thus, with the rotating internal combustion engine of the invention, one driving rotor and one driven rotor, or one driving rotor and two driven rotors are concentrically rotated together with each other so that the intake air or mixed air may be compressed to the higher pressure and the exhausted gas may by discharged, whereby the stable operation of the engine is achieved as well as lower production costs due to diminishing of the parts required and the entire dimensional size, and the greatly enhanced efficiencies may be also achieved.

What is claimed is:

1. A rotating internal combustion engine comprising:
   a central housing having a first cylinder, an intake port and a first exhaust port;
   a first driven rotor disposed in said first cylinder, said first driven rotor having a first engaged groove;
   a driving rotor having a first vane piston engageable with said first engaged groove, said driving rotor having a first bore having a longitudinal axis substantially perpendicular to the longitudinal axis of said first vane piston, said first bore extending obliquely from a front face to a rear face of said driving rotor for storing compressed air, the longitudinal axis of said bore extending in a continuous straight line from a first end to a second end of said bore, said driving rotor and said central housing defining a compression chamber and a combustion chamber;
   a front housing having an inner wall portion including an exhaust recess for passing said compressed air from the first bore in said driving rotor to said combustion chamber; and
   a rear housing having an inner wall portion including an intake recess for passing said compressed air to said bore in said driving rotor from said compression chamber, said air being at least partially compressed in said compression chamber.

2. The rotating internal combustion engine as claimed in claim 1 which further comprises a gear casing operatively associated with said first driven rotor and said driving rotor.

3. The rotating internal combustion engine as claimed in claim 1, wherein said first intake port and said first exhaust port are disposed at the upper portion of said central housing, and a second intake port and a second exhaust port are disposed at the lower portion of said central housing.

4. The rotating internal combustion engine as claimed in claim 1, wherein at least a portion of said rotors define a single plane, wherein said rotors are configured to perform the operations of intake, compression, explosion, and exhaust successively during their rotations.

5. The rotating combustion engine as claimed in claim 1, wherein the driving rotor is provided with a second vane piston and second inclined hole, such that said first and second vane pistons and said first and second inclined holes are positioned at substantially opposed positions, and said first driven rotor is provided with first and second engaged grooves at substantially opposed positions, said first and second engaged grooves engageable with said first and second vane pistons, respectively, such that the operations of intake, compression, explosion and exhaust are performed twice during each single rotation of said driving rotor.

6. The rotating combustion engine as claimed in claim 1, wherein said first vane piston extends from the driving rotor to a position adjacent to an inner wall of said second cylinder, said first vane piston being configured to directly receive the expansive and explosive force of an explosion within the combustion chamber, thereby eliminating throttling loss thereof.

7. The rotating internal combustion engine as claimed in claim 1, wherein said first driven rotor and said driving rotor each have a first vane piston, a first engaged groove and a first inclined hole, such that the explosive force is doubled during each rotation of said driving rotor.

8. A rotating internal combustion engine as claimed in claim 1, wherein said central housing includes a second cylinder and wherein said driving rotor is disposed in said second cylinder.

9. A rotating internal combustion engine as claimed by claim 1, wherein said central housing further comprises a second driven rotor and a second and a third cylinder, said driving rotor disposed in said third cylinder and said second driven rotor disposed in said second cylinder.

10. A rotating internal combustion engine as claimed by claim 9, further including a second intake and a second exhaust port, wherein said first intake and said exhaust port are disposed at the upper portion of said central housing and said second intake and said second exhaust port are disposed at the lower portion of said central housing.

11. A rotating internal combustion engine as claimed by claim 1, wherein said central housing further comprises a second driven rotor and a second and a third cylinder, wherein said driving rotor includes a first vertical hole and a first engaged piston and is disposed within the second cylinder, and wherein said second driven rotor includes an engaged groove and is disposed within said third cylinder.

12. A rotating internal combustion engine as claimed by claim 1, wherein said central housing further comprises a second driven rotor and a second and a third cylinder, wherein said driving rotor includes a first and a second vertical hole and a first and a second engaging piston and is disposed within the second cylinder, said first hole and first piston disposed in substantially opposed relation to said second hole and said second piston, and wherein said driven rotor includes an engaged groove and is disposed in said third cylinder.

13. A rotating internal combustion engine comprising:

a central housing having upper and lower portions and a front face and rear face, said central housing having a first cylinder disposed at the upper portion of said central housing and a second cylinder disposed at the lower portion of said central housing, said first and second cylinders having circular inner circumferential surfaces extending to the front and rear faces of said central housing, said cylinders having at least a portion of said inner circumferential surfaces communicated with each other, said central housing having an intake port and an exhaust port;

a driven rotor disposed in a gas-tight manner in said first cylinder, said driven rotor having an engaged groove on a portion of the outer circumferential surface;

a driving rotor having a front face and a rear face, said driving rotor being disposed in said second cylinder, said driving rotor having a vane piston on the outer circumferential surface thereof, said driving rotor having a bore extending obliquely from the rear face to the front face of said driving rotor for storing compressed mixed air, said bore having a longitudinal axis substantially perpendicular to the longitudinal axis of said first vane piston, said bore longitudinal axis extending in a continuous straight line from a first end to a second end of said bore;

a front housing having an inner wall portion including an exhaust recess for passing said compressed mixed air from the inclined hole in said driving rotor; and a rear housing having an inner wall portion including an intake recess for passing said compressed mixed air to the inclined hole in said driving rotor.

* * * * *